United States Patent [19]

Fecher

[11] Patent Number: 5,161,451
[45] Date of Patent: Nov. 10, 1992

[54] MODIFIER FOR VACUUM BOOSTER REACTION FORCE

[75] Inventor: Douglas A. Fecher, Granger, Ind.

[73] Assignee: Allied-Signal Inc., Morristown, N.J.

[21] Appl. No.: 799,522

[22] Filed: Nov. 27, 1991

[51] Int. Cl.$^5$ ............................................. F15B 9/10
[52] U.S. Cl. ............................ 91/369.4; 91/376 R
[58] Field of Search ........................ 91/369.1-369.4, 91/376 R

[56] References Cited

U.S. PATENT DOCUMENTS

| | | | |
|---|---|---|---|
| 4,354,423 | 10/1982 | Ohmi et al. | 91/369.3 |
| 4,611,526 | 9/1986 | Arino et al. | 91/369.2 |
| 4,690,034 | 9/1987 | Ando et al. | 91/369.2 |
| 4,718,327 | 1/1988 | Myers | 91/376 R |

FOREIGN PATENT DOCUMENTS 475313 8/1976 Australia .................... 91/369.4

Primary Examiner—Edward K. Look
Assistant Examiner—F. Daniel Lopez
Attorney, Agent, or Firm—Leo H. McCormick, Jr.; Ken C. Decker

[57] ABSTRACT

A spring and lever arrangement for imparting a spring force to a plunger of a control valve in a brake booster. The spring force is combined with an input force applied to the plunger during a brake application. A reaction force created by the resistance to movement of a pressurizing member by a output force developed in response to the input force overcomes the spring force and input force to control the development of an operational pressure differential such that the resultant output force for effecting a brake application varies as a nonlinear function.

4 Claims, 2 Drawing Sheets

MODIFIER FOR VACUUM BOOSTER REACTION FORCE

This invention relates to a vacuum brake booster wherein the reaction force communicated through a reaction member is modified to establish a nonlinear relationship between the operator supplied input force for effecting a brake application and the resulting output force created in the brake booster.

Traditionally the output force developed in a vacuum brake boosters is a linear function of an input force applied to the brake pedal. The input force applied to the brake pedal moves a plunger of a control valve to initially interrupt fluid communication between first and second chambers and thereafter allow a fluid to enter the first chamber to develop a pressure differential across a wall. The pressure differential acts on and moves the wall to develop the output force which is transmitted through a reaction member to an output member which correspondingly moves a piston in a master cylinder. The resistance of the piston to movement by the output force defines a reaction force which deforms the reaction member and balances the input force to establish the desired output force, U.S. Pat. No. 3,110,031 is a typical example of one such brake boosters. Over the years many modification have been made to this type brake booster in an attempt to provide a better feel or a smoother operation during a brake application, such as changing the or softer or as disclosed in U.S. Pat. No. 3,149,539 changing both the shape of the plunger and reaction member. However, even with all these changes, the resulting output force remains a linear function of the input force.

Recently the operational time required to effect the initiation of a brake application has been reduced by positioning a control valve in a brake booster in a ready or rest position by a key member to reduce the travel of a plunger by an input member as disclosed in U.S. Pat. No. 4,953,446. Consistent with traditional brake boosters, the resistance to movement developed by a piston in a master cylinder is transmitted through a reaction member to oppose the input force applied to move the plunger of the control valve. On further investigation of this vacuum brake booster, it has been determined that the operational time required to effect a brake application could be reduced through a modification of the relationship between the input force and output force.

In the present invention, a brake booster was developed having a nonlinear relationship between the input force and output force while at the same time delivering a smooth output force to operate a master cylinder. In this brake booster, a plunger is located in a bore of a hub connected to a movable wall. The plunger responds to the input force by moving in the bore from a rest position where the pressure level in a first chamber is substantially identical with the pressure level in a second chamber to an actuation position where air is communicated to the first chamber to create a pressure differential across the movable wall. The pressure differential acts on the wall and develops an output force which is transmitted through a reaction member to an output member. The resistance to movement of a piston in the master cylinder by the output force is transmitted back into the reaction member as a reaction force. The reaction force acts on reaction member to bring the reaction member into engagement with the plunger to oppose movement of the plunger to interrupt to continued communication of air to the first chamber. A lever located in the hub has a first end that engages the plunger and a second end connected to a spring. As the plunger moves in the bore with the hub to supply the output force to the piston in the master cylinder, the first end of the lever moves with the hub while the spring resiliently holds the second end of the lever. As the hub moves, the first end of the lever moves about a fulcrum on the hub to transmit a spring force to the plunger. The spring force is combined with the input force to hold the plunger in an actuation position until the reaction force is sufficient to overcome these combined force and thereafter moves the plunger to interrupt the communication of air to the first chamber. The resultant output force supplied to the piston in the master cylinder varies as a nonlinear function of the input force applied by the operator to effect a desired brake application.

It is an object of this invention to provide a brake booster which develops a nonlinear output force in response to a linear input force applied by an operator to effect a brake application.

It is a further object of this invention to provide a brake booster with a plunger in a control valve arrangement which is responsive to a linear and nonlinear input force to control the development of a corresponding nonlinear output force.

It is another object of this invention to provide a brake booster with lever means to communicate a spring force to a plunger to develop a nonlinear output force from a linear input force.

These objects and advantages should be apparent from reading this specification while viewing the drawings in which.

Figure 1:
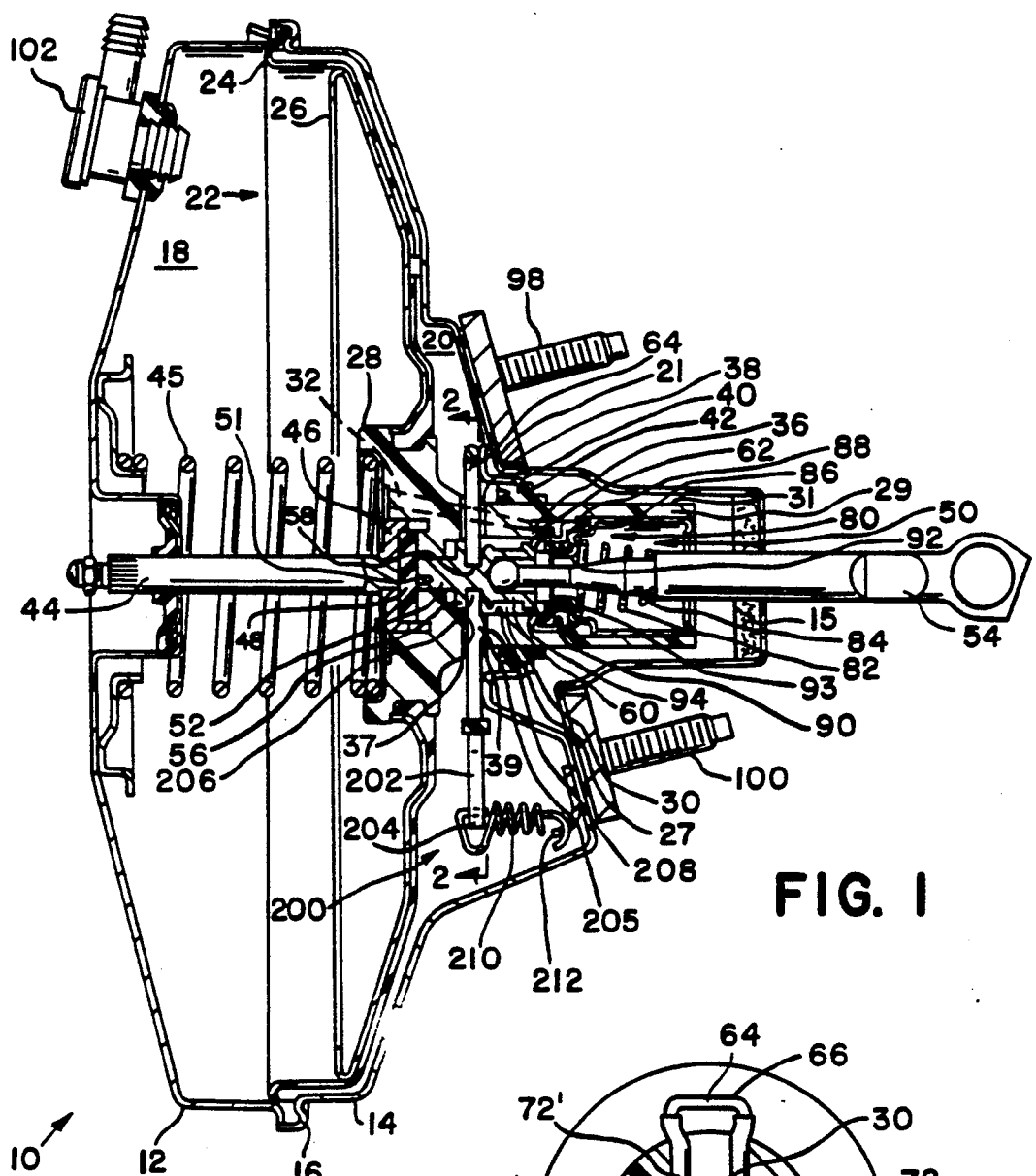
FIG. 1 is a schematic illustration of a brake booster with a resilient member for providing a plunger of a control valve with a nonlinear input which is combined with an operator applied input to produce a corresponding nonlinear output force in according to the principles of this invention.

The servomotor 10 shown in FIG. 1 is designed to supply a master cylinder in a brake system with an operational force to effect a brake application. The servomotor 10 is designed to be quiet, efficient and provide an immediate response to an input force to develop a nonlinear output force for effectively operating the master cylinder.

The servomotor 10 has a front shell 12 joined to a rear shell 14 by a series of lances and tabs 16 to form a sealed housing. The interior of the sealed housing is divided into a front chamber 18 and a rear chamber 20 by a movable wall 22. The movable wall 22 includes a diaphragm 24, backing plate 26 and a hub 28. Hub 28 has a cylindrical body 29 with a stepped bore 30 that extends therethrough, a plurality of passages 32 and 32' extend to an annular vacuum seat 36, and a radial slot 38. The cylindrical body 29 extends through an opening 40 in the rear shell 14 to communicate air from the surrounding environment into bore 30. A seal 42 of the type disclosed in U.S. Pat. No. 4,898,081, which is located between opening 40 and the exterior surface 31 on the cylindrical projection 29, seals chamber 20 from the surrounding environment.

An output push rod 44 has a head 46 that encloses reaction disc 48 located in the stepped bore 30. The output push rod 44 engages a piston in the master cylinder.

A control valve 50 located in bore 30 has a plunger 52 connected to an input push rod 54 attached to a brake pedal. Plunger 52 has first flange 56 that engages a bearing surface on hub 28 in bore 30, a groove 58, a contoured second flange 60 and a tapered atmospheric seat 62 located of the end thereof.

Figure 2:
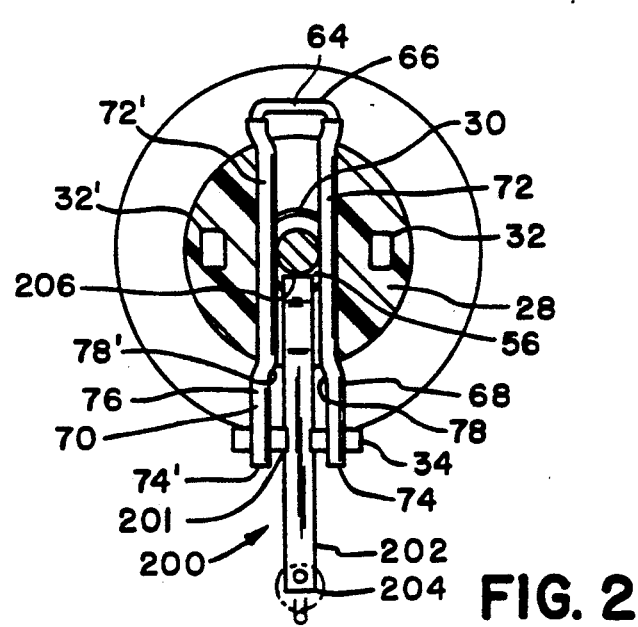
FIG. 2 is sectional view taken along lines 2-2 of FIG. 1.

A key member 64 as best shown in FIG. 2 has a base member 66 with legs 68 and 70 that extend therefrom. Each leg 68 and 70 has a central section 72, 72' and an end section 74, 74'. The key member is made of a cylindrical wire that is bent into the shape shown in FIG. 2. Thereafter, a rubber or plastic coating 76 is placed around the key member 64. The key member 64 is inserted in slot 38 to hold plunger 50 in bore 30.

During the insertion into slot 38, ends 68 and 70 of key member 64 are initially pinched together until tangents 78, 78' engage groove 58 on plunger 50. Thereafter, ends 68 and 70 expand as central sections 72, 72' move into the cylindrical body 29 and later fully expand to lock the key member 64 in the cylindrical body 29 as shown in FIG. 2. Thereafter a retainer 34 is attached to ends 68 and 70.

The resilient arrangement 200, which includes lever 202 and spring 210, provides plunger 52 with a nonlinear input during a brake application. Lever 202 has a first end 204 separated from a second end 206 by a contact point 205 that engages a fulcrum 208 on cylindrical body 29. Resilient retainer 34 is located in groove 201 on lever 202. Resilient retainer 34 assures that end 206 is located in bore 30 adjacent flange 56 on plunger 52. Thereafter spring 210 is connected to the second end 204 of lever 202 and to clip 212 attached to mounting bolt 100 on shell 14.

Prior to the insertion of the plunger 50 into bore 30, poppet valve 80 is attached to the push rod 54. Poppet valve 80 includes a return spring 82 and a flexible member 90. Return spring 82 has first end located on shoulder 84 of the push rod 54 and a second end that engages retainer 86. A bead 88 on a first end of the flexible section 90 is held against a shoulder on the cylindrical body 29 by retainer 86 while a valve face 94 on disc 93 on a second end is urged toward annular vacuum seat 36 by valve spring 92 connected to retainer 86. On insertion of the plunger 52 into bore 30, retainer 86 holds bead 88 against shoulder 95 such that in the rest position return spring 82 acts on push rod 54 and valve spring 92 seat face 94 on atmospheric seat 62 to seal at least portion 27 of the bore 30 from the surrounding atmosphere.

The servomotor 10 is installed in a vehicle through mounting bolts 98 and 100 and push rod 54 is attached to the brake pedal of the vehicle. Check valve 102 in the front shell 12 is connected to the intake manifold of an internal combustion engine in a vehicle. When the engine is operating, vacuum present at the intake manifold evacuates air from booster 10. An evacuation pressure differential acts on plunger 52 to move face 94 away from vacuum seat 36 to allow any air present in chamber 20 to be evacuated into chamber 18 via bore section 27, slot 38 and Passages 32, 32'. When the fluid pressure in chambers 18 and 20 equalizes, valve spring 92 moves plunger 52 to again position face 94 on vacuum seat 36 and to isolate chamber 20 from chamber 18 with the control valve 50 in the rest position as shown in FIG. 1.

Figure 3:
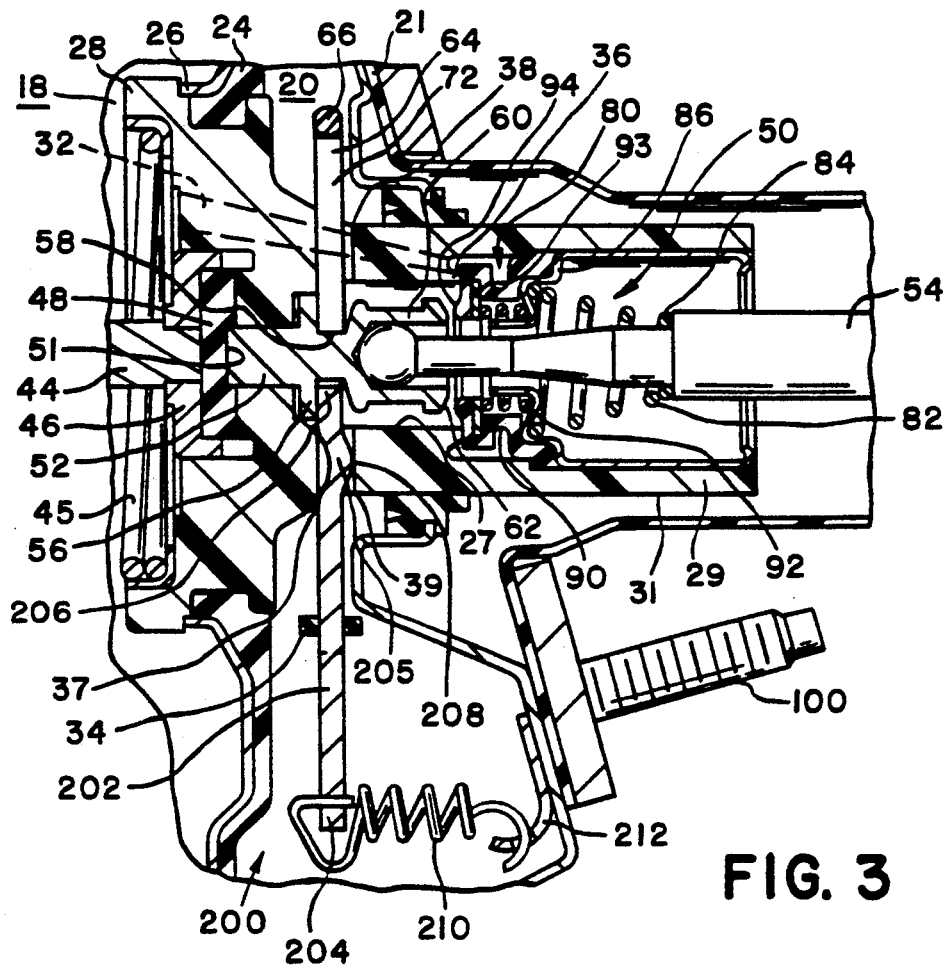
FIG. 3 is a schematic illustration of a portion of the brake booster of FIG. 1 wherein the plunger of the control valve is in an actuation position.
Figure 4:
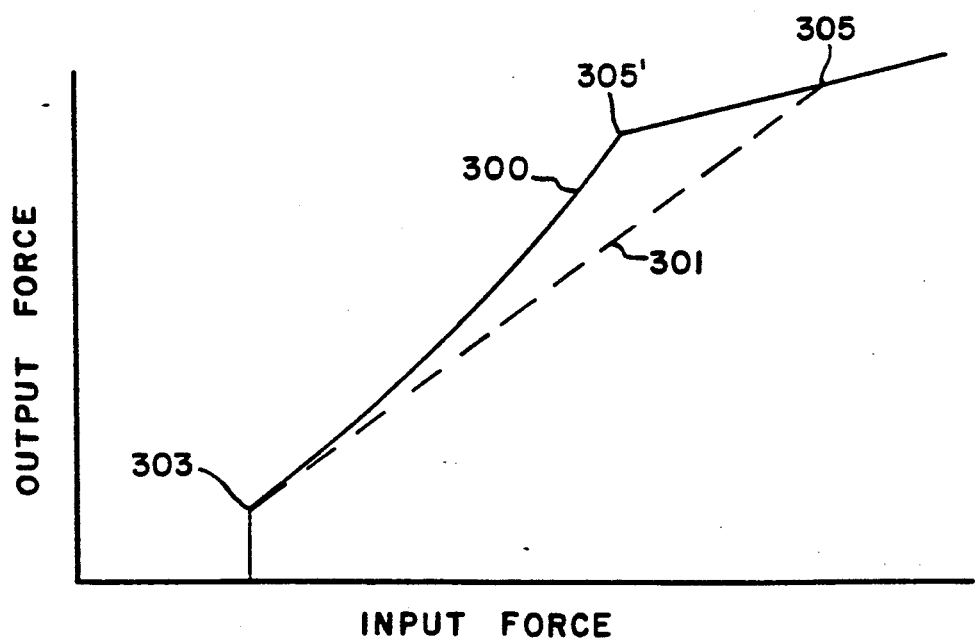
FIG. 4 is a graph illustrating the relationship that occurs between an input force and an output force during a brake application.

In response to an input force applied to push rod 54, control valve 50 is moved to an operational position as shown in FIG. 3 to effect a brake application. In the actuation position, plunger 54 immediately moves atmospheric seat 62 away from face 94 to allow air to flow through filter 15 into bore 30 for presentation to chamber 20. With air in chamber 20 and vacuum in chamber 18, a pressure differential is created across wall 22. The pressure differential acts on wall 22 to produce an output force which is transferred from hub 28 through reaction disc 48 to push rod 44. Initially, the output force overcomes return spring 45 to supply pistons in the master cylinder with an actuation force. As wall 22 moves, end 206 of lever 202 moves about fulcrum 208 in hub 28. However end 204 of lever 202 is resiliently held by spring 210 and as a result the operational force applied to plunger 52 by end 206 is function of the spring force of spring 210 modified by the ratio of the distances between the point of contact 205 and ends 204 and 206. The resistance to movement of the pistons in the master cylinder create a reaction force which is transmitted to the reaction member 48. The reaction force deforms the reaction member 48 and brings the reaction member 48 into contact with face 51 on plunger 52. The reaction force acts through the plunger 52 to counter the input force supplied by the operator though push rod 54 and the modified spring force applied to the plunger 52 by lever arrangement 200. Curve 300 in FIG. 4 illustrates the development of an output force produced by brake booster 10 in response to an input force. When the reaction force developed as a result of the output force balances with the combined forces of the input force and modified spring force applied by lever arrangement 200, any additional reaction force moves the plunger 52 to bring atmospheric seat 62 on plunger 52 into engagement with face 94 face on the poppet valve 80 to terminate the communication of air to chamber 20.

Curve 301 in FIG. 4 illustrates a force relationship for a conventional brake booster. As can be seen by curve 301, the output force produced by the brake booster between the knee point 303 and vacuum runout point 305 has a linear relationship with the input force applied to an input push rod. Whereas, curve 300 which represents the output force of brake booster 10, clearly a nonlinear functional relationship occurs between the output force and the operator applied input force between the knee point and vacuum runout point 305'. Thus, brake booster 10 because of its unique functional operation is capable of developing a larger output force from a given input force over the same initial time period than a conventional brake booster.

On termination of the input force on push rod 54, return spring 82 moves plunger 50 toward a release position. In the release position, atmospheric seat 62 engages face 94 on poppet valve to prevent the communication of air through bore 30. At the same time, flange 56 on plunger 52 engages central segments 72, 72' on key member 64 to move key member 64 into engagement with the bottom 39 of slot 38 to define a full release position whereby air is now evacuated from chamber 20 to chamber 18, via slot 38, bore section 31 and passages 32, 32', to equalize the fluid pressure therebetween. As wall 22 approaches the rear shell 14, the base section 66 and end members 74, 74' of the key member 64 engages an arcuate stop 21 on the rear shell 14 to hold plunger 50 stationary as the hub 28 while wall 22 continues to move toward the rear shell 14 by the force of the return spring 45. The size of the plurality of openings 32, 32' and the slot 38 is such that the fluid pressure in chambers 20 and 18 is substantially identical when the key member 64 engages an arcuate stop 21. As the hub 28 continues to move toward the rear shell 14, key member 64 moves in slot 38 such that when wall 22 reaches its rest position, central sections 72, 72' engage the top 37 of slot 38. With the key member 64 positioned at the top 37 of the slot 38, valve spring 92 seats face 94 on vacuum seat 36 to inhibit fluid communication between chambers 18 and 20. During the movement of wall 22 moves toward its rest position, end 206 of lever 202 is carried by hub 28 while spring 210 returns end 204 to a position illustrated in FIG. 1. In the rest position, spring 210 does not exert any spring force on plunger 52. Thereafter, control valve 50 is in the ready position capable of an immediate respond to an input force applied to push rod 54 to allow air to be presented to chamber 20 to begin the development of a pressure differential from which a nonlinear output force from a linear input force to effect a desired brake application.

I claim:

1. In a brake booster having a plunger located in a bore of a movable wall and responsive to an input force for controlling the flow of a first fluid to a first chamber to create a pressure differential with a second fluid in a second chamber, said pressure differential acting on the movable wall to develop an output force that is transmitted through a reaction member to an output member for moving a pressurizing device to effect a desired brake application, said pressurizing device resisting movement by the output force to develop a reaction force which is transmitted back through the reaction member to oppose and neutralize the input force, said neutralization of the input force terminating the communication of the first fluid to said first chamber to limit the development of said pressure differential, the improvement comprising:

key means for retaining said plunger in said bore to limit the movement of the plunger by the reaction force;

a lever having a first end and a second end, said lever engaging a fulcrum on said movable wall to define a ratio of the distances between the first and second ends and the fulcrum, said first end engaging said plunger; and a spring connected to said second end, said lever transferring a spring force to said plunger through said first end, said spring force being combined with the input force during a brake application, said reaction force neutralizing the combined forces acting on said plunger to develop an output force and effect said desired brake application, said spring force increasing as a function of the movement of said movable wall means to modifying said reaction force such that the relationship between said input force and the output force in response to said pressure differential varies as a nonlinear function.

2. In the brake booster as recited in claim 1 wherein said key means includes: p1 retainer means for holding the first end of said lever in a substantially fixed position with respect to said plunger.

3. In the brake booster as recited in claim 2 wherein said key means provides guidance to maintain said lever in an axial plane as the movable wall moves in response to the pressure differential.

4. In the brake booster as recited in claim 2 further including:

a clip member attached to the wall of said booster for retaining said spring.

* * * * *